(12) United States Patent
Edmiston

(10) Patent No.: US 9,565,137 B2
(45) Date of Patent: Feb. 7, 2017

(54) CUT-THROUGH FORWARDING MODULE AND A METHOD OF RECEIVING AND TRANSMITTING DATA FRAMES IN A CUT-THROUGH FORWARDING MODE

(75) Inventor: Graham Edmiston, Bridge of Weir (GB)

(73) Assignee: NXP USA, Inc., Austin, TX (US)

( * ) Notice: Subject to any disclaimer, the term of this patent is extended or adjusted under 35 U.S.C. 154(b) by 242 days.

(21) Appl. No.: 14/395,718

(22) PCT Filed: Apr. 26, 2012

(86) PCT No.: PCT/IB2012/052091
§ 371 (c)(1),
(2), (4) Date: Oct. 20, 2014

(87) PCT Pub. No.: WO2013/160730
PCT Pub. Date: Oct. 31, 2013

(65) Prior Publication Data
US 2015/0117446 A1    Apr. 30, 2015

(51) Int. Cl.
*H04L 12/947* (2013.01)
*H04L 29/06* (2006.01)
*H04L 12/933* (2013.01)
*H04L 12/721* (2013.01)

(52) U.S. Cl.
CPC ......... *H04L 49/251* (2013.01); *H04L 49/1546* (2013.01); *H04L 69/12* (2013.01); *H04L 45/40* (2013.01)

(58) Field of Classification Search
CPC .... H04L 49/251; H04L 49/1546; H04L 45/40; H04L 69/12
See application file for complete search history.

(56) References Cited

U.S. PATENT DOCUMENTS

| | | |
|---|---|---|
| 6,144,668 A | 11/2000 | Bass et al. |
| 6,731,638 B1 | 5/2004 | Ofek |
| 7,000,031 B2 | 2/2006 | Fischer et al. |
| 7,406,106 B2 | 7/2008 | Mallory |
| 7,729,387 B2 | 6/2010 | Beck et al. |

(Continued)

FOREIGN PATENT DOCUMENTS

| | | |
|---|---|---|
| CN | 101014156 A | 8/2007 |
| CN | 101471827 A | 7/2009 |
| CN | 102215436 A | 10/2011 |

OTHER PUBLICATIONS

International Search Report and Written Opinion correlating PCT/IB2012/052091 dated Dec. 14, 2012.

*Primary Examiner* — Ajay Cattungal

(57) ABSTRACT

The disclosure relates to cut-through forwarding module, an integrated circuit, a semiconductor device and a method of receiving and transmitting data frames in a cut-through forwarding mode. The cut-through forwarding module processes received data frames in data blocks. The module comprises a pre-loading unit for storing a first data block of a received data frame. The stored first data block may be pre-loaded by the pre-loading unit in a transmitter unit before a receiver unit receives a subsequent data frame. The processing unit controls the transfer of a first data block to the pre-loading unit and controls the use of a pre-loaded data block as a first data block of a data frame to be transmitted.

20 Claims, 5 Drawing Sheets

(56) References Cited

U.S. PATENT DOCUMENTS

| | | | |
|---|---|---|---|
| 8,036,216 B1* | 10/2011 | Wang | H04L 47/10 370/389 |
| 8,635,353 B2* | 1/2014 | Pope | H04L 49/9094 370/466 |
| 2002/0085565 A1 | 7/2002 | Ku et al. | |
| 2003/0093503 A1 | 5/2003 | Yamaki et al. | |
| 2003/0107996 A1 | 6/2003 | Black et al. | |
| 2004/0066782 A1 | 4/2004 | Nassar | |
| 2004/0073715 A1* | 4/2004 | Folkes | H04L 45/00 709/250 |
| 2005/0058149 A1 | 3/2005 | Howe | |
| 2005/0094640 A1* | 5/2005 | Howe | H04L 47/2416 370/395.1 |
| 2005/0129047 A1* | 6/2005 | Ku | H04L 45/40 370/428 |
| 2005/0216597 A1* | 9/2005 | Shah | H04L 69/12 709/230 |
| 2005/0271073 A1* | 12/2005 | Johnsen | H04L 49/251 370/428 |
| 2005/0289238 A1* | 12/2005 | Mapp | G06F 13/385 709/234 |
| 2006/0268719 A1 | 11/2006 | Takase et al. | |
| 2007/0268903 A1* | 11/2007 | Nakagawa | H04L 45/745 370/392 |
| 2008/0019395 A1 | 1/2008 | Aithal | |
| 2008/0205441 A1 | 8/2008 | Furey et al. | |
| 2008/0273545 A1* | 11/2008 | Sgouros | H04L 41/5022 370/412 |
| 2009/0067431 A1* | 3/2009 | Huang | H04L 49/90 370/394 |
| 2010/0008359 A1* | 1/2010 | Kay | H04L 63/1416 370/389 |
| 2010/0306511 A1 | 12/2010 | Mochizuki et al. | |
| 2011/0219208 A1* | 9/2011 | Asaad | G06F 15/76 712/12 |
| 2012/0002680 A1* | 1/2012 | Naouri | H04L 47/245 370/428 |
| 2013/0016724 A1* | 1/2013 | Thaler | H04L 47/245 370/393 |
| 2014/0029625 A1 | 1/2014 | Edmiston | |

* cited by examiner

– 1 –
CUT-THROUGH FORWARDING MODULE AND A METHOD OF RECEIVING AND TRANSMITTING DATA FRAMES IN A CUT-THROUGH FORWARDING MODE

FIELD OF THE INVENTION

This invention relates to a cut-through forwarding module for performing cut-through forwarding of data packets. The invention further relates to method of receiving and transmitting data frames in a cut-through forwarding mode.

BACKGROUND OF THE INVENTION

In the field of computer networking, cut-through forwarding, also known as cut-through switching, is a switching method for packet switching systems in which a network switch starts forwarding a frame (or packet) before the whole frame has been received by the network switch. Such a forwarding operation is performed typically as soon as the destination address has been processed. In this manner, cut-through forwarding enables the latency through the switch to be significantly reduced. The use of cut-through forwarding is an important feature of packet orientated deterministic automation systems. Furthermore, the implementation of such systems is expanding in the industrial market, and the technique is increasingly finding its way into solutions for the home, medical and automotive applications.

Cut-through forwarding systems typically require tight control over the latency of a switch (which is the delay between data being received by the switch and that data subsequently being transmitted (forwarded on) by the switch) and jitter (which is the variance in time periods between reception and the transmission of the same frame) in order to ensure deterministic behaviour and scalability. Typically, such latency/jitter requirements differ between different cut-through 'modes' (for example, between different packet switching protocols). For example, such cut-through modes might include, by way of example, Ethernet protocols such as EtherCAT (Ethernet for Control Automation Technology), ProfiNET, Ethernet/IP, DLR (Device Level Ring) or a cut through switch for IP traffic. Control over latency and jitter is of particular importance for cut-through forwarding modes that involve Ethernet frames and the like, in which frames are unpredictably spaced and may be seconds apart or back to back, unlike, say, Voice over IP (VoIP) which has predictable frame spacing. In order for a cut-through switch to be competitive in the market place, it must be capable of supporting such deterministic behaviour and scalability across multiple cut-through switching modes.

Conventionally, tight control of latency and jitter is provided by way of dedicated hardware blocks that are arranged to meet specific latency and jitter requirements. The use of such dedicated hardware blocks on a single device leads to a relatively expensive and inflexible solution. In particular, in order for a given switch to be able to meet the requirements of more than one cut-through mode, a separate, dedicated hardware block is required for each cut-through mode, thereby resulting in a significant increase in cost, power consumption and real estate requirements for the switch.

SUMMARY OF THE INVENTION

The present invention provides a cut-through forwarding module, an integrated circuit and a semiconductor device as described in the accompanying claims. The invention further provides a method of receiving and transmitting data frames in a cut-through forwarding mode.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Examples of the present invention will now be described with reference to an example of a cut-through forwarding module, such as may be implemented within a packet switching system. However, the present invention is not limited to the specific instruction cut-through forwarding architecture herein described with reference to the accompanying drawings, and may equally be applied to alternative architectures. For example, for the illustrated examples, the cut-through forwarding module is illustrated as comprising a single, unitary processing unit for processing data blocks, controlling transfer of data blocks and controller use of the specific data blocks. However, the functionality of the processing unit herein described may equally be provided across a plurality of processors or CPU's, and/or the functionality of such a processing unit may equally be distributed across a plurality of functional modules. Additionally, because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
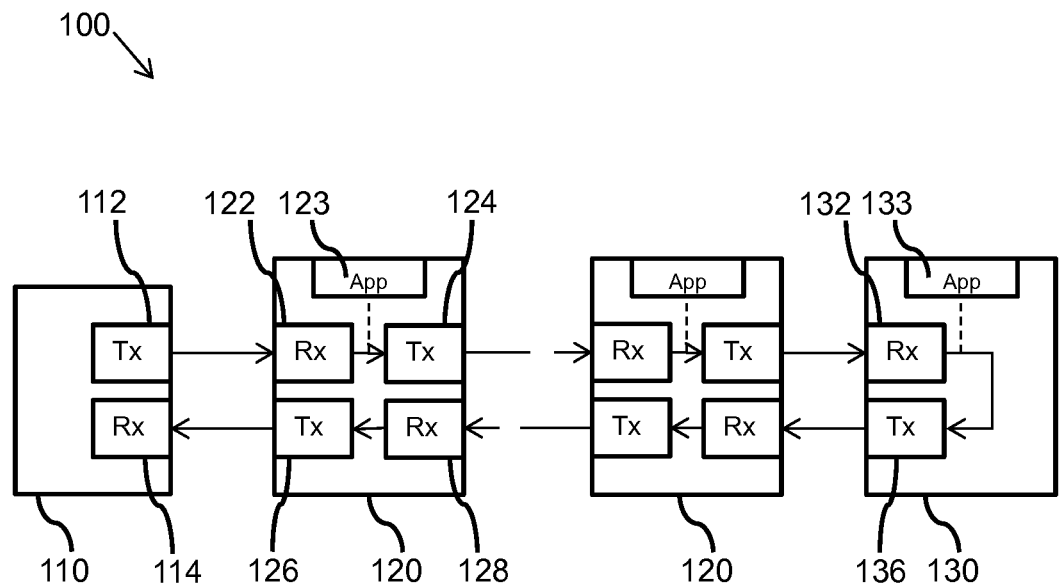
FIG. 1 schematically shows a simplifies block diagram of a packet switching system comprising nodes which operate according to the cut-through forwarding principle, FIG. 2 schematically shows an example of a cut-through forwarding mode, FIG. 3 schematically shows another example of a cut-through forwarding mode, FIG. 4 schematically shows a further example of a cut-through forwarding mode, and FIG. 5 schematically shows an example of a method of receiving and transmitting data frames in a cut-through forwarding mode.

In FIG. 1 a simplified block-diagram of a packet switched network 100 with cut-through forwarding nodes 120, 130 is presented. Node 110 is a master node which transmits data frames in an upstream direction to a chain of slave nodes 120, 130. A transmitter unit Tx transmits the data frames. The data frames start with a preamble which is used by the physical layer to synchronize the receiving device with the transmitting device. The data frame further comprises a data packet after the preamble. The data packet comprises the actual data of the data frame. For example, after the preamble a maximum of 1518 bytes follow in an Ethernet data packet. The master node 110 also comprises a receiver unit Rx which receives a flow of downstream data frames from the chain of slave nodes 120, 130. The slave nodes 120, 130 are coupled in a chain and the last slave node 130 is a node for terminating the chain of slave nodes 120, 130.

The slave nodes 120 receive the upstream data frames on their upstream receiver unit 122 from a previous node in the chain. Before the data packets of the data frames are completely received they are already forwarded to the upstream transmitter unit 124 which starts the transmission of the data frame comprising the data packets even before the whole data packet has been received. The upstream transmitter unit 124 transmits the data frame to a subsequent node in the chain. The upstream of data packets is monitored by the application processing unit 123 and data which is relevant for the specific slave node is processed by the application processing unit 123. If the application processing unit 123 wants to transmit data to other nodes, it may insert data into specific unused locations of the upstream data packets which are forwarded by the slave node from the upstream receiver unit 122 to the upstream transmitter unit 124. Slave nodes 120 do not generate data packets/frames themselves and only use the unused portions of the data packet of the upstream data packets to transmit data to other units. The master unit 110 is, in the example of FIG. 1, the only node in the packet switched network 100 which generates new data packets/frames. The slave nodes 120 have also a downstream reception unit 128 at which they receive data frames from the subsequent node in the chain. The data packets of the received data frames are, without being inspected, forwarded to the downstream transmitter unit 126 for transmission of the data frames to the previous node in the chain of nodes. The downstream transmitter unit 126 also starts the transmission of the data frames before the complete data packet of the corresponding data frame has been received by the downstream receiver unit 128. The slave node 130, which terminates the chain, has only an upstream receiver unit 132 for receiving data frames from a previous node in the chain and a downstream transmitter unit 136 for transmitting frames to the previous node in the chain. The data packets received in the data frames at the upstream receiver unit 132 are forwarded to the downstream transmitter unit 136. The downstream transmitter unit 136 starts transmitting the data packets in data frames before the complete data packets has been received by the upstream receiver unit 132. The forwarded data packets are monitored by the application processing unit 133 such that the slave node 130 is able to process data which is relevant for the application which are executed by the slave node 130 and such that the slave node 130 is able to transmit application data in specific unused locations of the forwarded data packets. It is to be noted that the slave node 130 may have, in other embodiments, and additional transmitter and receiver units. For example, the slave node 130 may have the same hardware structure as slave nodes 120, but, because no additional Ethernet connection is coupled to the upstream transmitter unit and to the downstream receiver unit, the data packets received at the upstream receiver unit Rx are transferred to the downstream receiver unit Tx instead of being transferred to the upstream transmitter unit. This provides additional flexibility for setting up a specific network structure.

The topology of the packets switched network 100 is illustrative for the EtherCAT system which may be used to communicate information in a control automation technology, such as the control of a factory production line. The EtherCAT system allows the effective use of the bandwidth of the Ethernet system and because of the cut-through forwarding latency is reduced. To support a plurality of cut-through modes, a generic and flexible cut-through module is required as well as deterministic latency.

Figure 2:
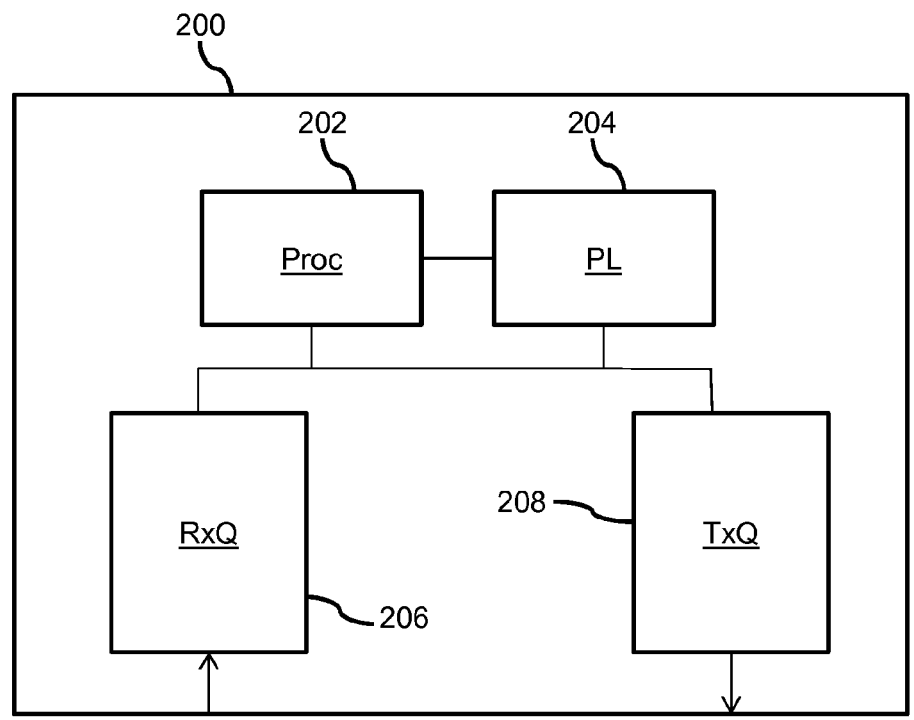
Figure 2:
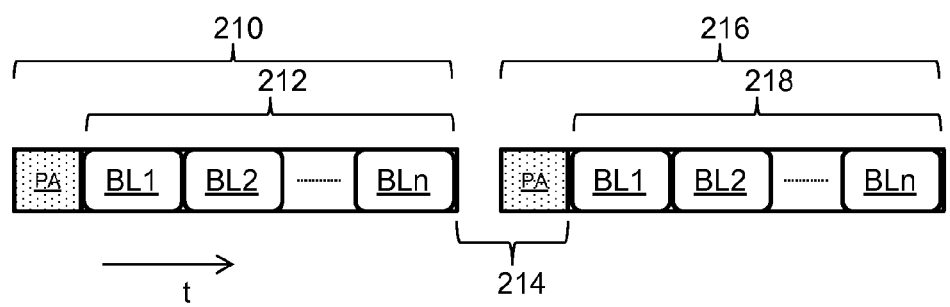

FIG. 2 presents a cut-through forwarding module 200. The cut-through forwarding module 200 may be used in, for example, one of the slaves 120, 130 of the packet switched network 100 of FIG. 1 and may be used in the upstream or downstream direction. Especially when the data packets must be monitored or processed, such as in the upstream direction, the cut-through forwarding module 200 provides an advantageous flexibility.

The cut-through forwarding module 200 comprises a receiver unit RxQ, 206, a transmitter unit TxQ, 208, a processing unit Proc, 202 and a pre-loading unit PL, 204. The receiver unit RxQ, 206 receives data frames from a network. The preamble of the data frame is used by the receiver unit RxQ, 206 only for synchronization and is not considered to be data for further processing and further transmission. The receiving unit RxQ, 206 partitions the data packet into data blocks. The data blocks are forwarded to the processing unit Proc, 202 and/or to the transmitter unit TxQ, 208. The transmitter unit TxQ, 208 is configured to transmit data frames on basis of data packets received by the receiving unit RxQ, 206 and on basis of data blocks received from the pre-loading unit PL, 204 and received from the processing unit Proc, 202. The transmitter unit TxQ, 208 adds a preamble to the data packet that it has to transmit. The data packet to be transmitted is determined by the data block which the transmitter unit TxQ, 208 receives from the receiving unit RxQ, 206, the processing unit Proc, 202 and/or the pre-loading unit PL, 204. The transmitting unit TxQ, 208 comprises a transmitter queue in which data blocks of a data packet to be transmitted are temporarily stored.

The pre-loading unit PL, 204 is configured to store a data block and the pre-loading unit PL, 204 is capable of pre-loading the data block that is stored in the pre-loading unit PL, 204 into the transmitting unit TxQ, 208. Pre-loading means that the data block stored in the pre-loading unit PL, 204 is loaded into the queue of the transmitting unit TxQ, 208 for transmission and at the particular moment of loading the data block into the transmitter unit TxQ, 208 it is not yet defined whether this data block is going to be transmitted. Pre-loading is also performed in a time interval during which no other data is available to load into the transmission queue of the transmitter unit TxQ, 208, especially when no data packet is being received at the receiver unit RxQ, 206 (thus, during a period of time which is often called the inter frame gap) or when a pre-amble of a later received data frame is being received by the receiver unit RxQ, 206.

The processing unit Proc, 202 is configured to process the data blocks, which means that it detects whether a data packet received or particular data blocks of the data packet are relevant for the device which comprises the cut-through forwarding module 200 and/or processes the relevant data in the running applications and/or forwards the relevant data to a separate processor which runs the applications. The processing unit Proc, 202 further controls the transfer of data blocks received at the receiver unit RxQ, 206 to the transmitter unit TxQ, 208 such that, according to the cut-through forwarding mode of the module, the transmission of a data frame comprising the received data blocks can start before the complete data packet is received. The data blocks to be transferred need not necessarily to pass the processing unit Proc, 202. Hardware forwarding from a queue in the receiver unit RxQ, 206 to the queue of the transmitter unit TxQ, 208 based on control signals provided by the processing unit Proc, 202 also falls within the scope of the invention. Further, the processing unit Proc, 202 controls the transfer of a first data block of a specific received data frame to the pre-loading unit PL, 204. In other words, if a new data frame is being received and the first data block of the data packet of the received data frame is analysed by the processing unit Proc, 202, the processing unit Proc, 202 is configured to decide whether the first data block of that new data frame needs to be stored in the pre-loading unit PL, 204. Further, the data block stored in the pre-loading unit PL, 204 may have been transferred to the queue of the transmitter unit TxQ, 208 in a period of time during which no data packet was being received at the receiving unit RxQ, 206. This data block is not automatically transmitted as the first data block of a data frame to be transmitted by the transmitter unit TxQ, 208. The processing unit Proc, 202 is configured to decide whether the already pre-loaded data block is going to be used as the first data block of a data frame which is going to be transmitted after a transmission of a specific data frame which was based on the received data frame from which the data block stored in the pre-loading unit PL, 204 originates. Subsequently the processing unit Proc, 202 is able to control the transmission of this pre-loaded data block as the first data block of the data frame which is going to be transmitted within a short and deterministic period of time.

At the bottom end of FIG. 2 two data frames 210, 216 are schematically drawn. The time-axis is also indicated. The first data frame 210 is received before the second data frame 216. Each data frame 210, 216 starts with a preamble PA which is only used at the physical level to synchronize the receiver unit to the transmitter unit which transmitted the respective data frames 210, 216. The preamble does not contain data which is important for the devices which comprise the cut-through forwarding module 200. Each data frame further comprises a data packet 212, 218 which is subdivided by the receiving unit RxQ, 206 into data blocks BL1 . . . BLn. The data packet comprises data relevant for the datalink layer and higher layers of the OSI communication layers. The data packets 212, 218 comprise, for example, an Ethernet data packet of 64 to 1518 bytes. In an embodiment, the data blocks BL1 . . . BLn are all of an equal number of bits—their size is equal. In practical embodiments, the size of a single data block BLx is 8 bytes. In another embodiment, the size is 4 bytes.

For example, in an EtherCAT system the data packets are always Ethernet data packets of a variable size. An Ethernet data packet always starts with Destination Address, Source Address and the type field. In, for example, EtherCAT systems, the data packets transmitted in a chain of nodes have often the same Destination Address, Source Address and type field. Thus, the beginning of a plurality of subsequently received data packets is equal to the beginning of the first received data packet. Thus, as shown at the bottom end of FIG. 2, the first data block BL1 of data packet 218 is equal to the first data block BL1 of data packet 212. This provides an opportunity to optimize the cut-through forwarding operation of the cut-through forwarding modules.

The cut-through forwarding module 200 provides this optimization by means of the pre-loading unit PL, 204 and the control of the pre-loading unit PL, 204 via the processing unit Proc, 202. If the first data packet 212 is being received and the first data block BL1 of the first data packet 212 is being analysed and/or processed by the processing unit Proc, 202, the first data block BL1 is transferred to the transmitter unit TxQ, 208 and to the pre-loading unit PL, 204. The first data block BL1 is transferred to the transmitter unit TxQ, 208 such that the transmission of a data frame based on the received first data packet can start. The first data block BL1 is also transferred to the pre-loading unit PL, 204 for being stored in this unit such that the content of the first data block BL1 can be pre-loaded into the transmitter unit TxQ, 208 when no new data is received by the receiver unit RxQ, 206. The period during which no new data is received by the receiver unit RxQ, 206 is indicated in FIG. 2 by time period 214—the period includes the time frame during which no data frame is received by the receiver unit RxQ, 206 and may optionally include the period during which the preamble PA of the subsequent data frame 216 is received. If the first block BL1 is pre-loaded into the transmitter unit TxQ, 208, the transmitter unit TxQ, 208 can start transmitting a subsequent data frame as soon as possible when a subsequent data frame 216 is being received at the receiver unit RxQ, 206 without the need to process the first data block BL1 of the subsequent data frame 216 in the processing unit Proc, 202 and without the need to transfer the first data block 216 to the transmitter unit TxQ, 208. In practical embodiments, the transmission of the first data block BL1, which is being pre-loaded into the transmitter unit TxQ, 208, can start immediately after reception of the first data block BL1 of the subsequent data packet 218. This moment immediately after reception of the first data block BL1, is the moment in time that the Proc, 202 can control the use of the pre-loaded data block because the contents of the received first block is known by the cut-through forwarding module. Thus, the latency is determined by the size of the preamble PA and the size of the first data block BL1.

After the reception and processing of the first data frame 210, the first data block BL1, which is preloaded in the pre-loading unit PL, 204, can be used for the transmission of data frames which are transmitted after the transmission of a data frame which is based on the received first data frame 210. Depending on the specific types of data and the topology of the packet switched network in which the cut-through forwarding module is being used, not all data packets have exactly the same content in their first data block BL1. It is to be noted that the processing unit Proc, 202 controls the use of the first data block BL1 that is pre-loaded in the transmitter unit TxQ, 208 which means that the processing unit Proc, 202 provides the transmitter unit TxQ, 208 with a signal which indicates that the pre-loaded first block BL1 may be used or not, thus, may be transmitted or must be discarded. It might be that the pre-loaded first data block BL1 may not be used for a data frame to be sent. Then the pre-loaded first data block BL1 is discarded and the processor controls the transfer of another first data block BL1 to the transmitter unit TxQ, 208. In yet another embodiment of specific networks with specific network topologies, the pre-loaded first data block BL1 may be used for a subsequently sent data frame, although it seems that the content of a first data block BL1 of a later received data packet 218 is different from the content of the first data block BL1 of the first received data packet 212. This is, for example, the case when all nodes in a chain perform cut-through forwarding and the master nodes do not depend on the destination address and source address of the Ethernet data packets.

The use of the processing unit Proc, 202 allows the implementation of different cut-through forwarding modes and no additional hardware must be added to the module to support such different modes—only other program code must be provided to the processing unit Proc, 202 which implements the different cut-through forwarding modes.

Figure 3:
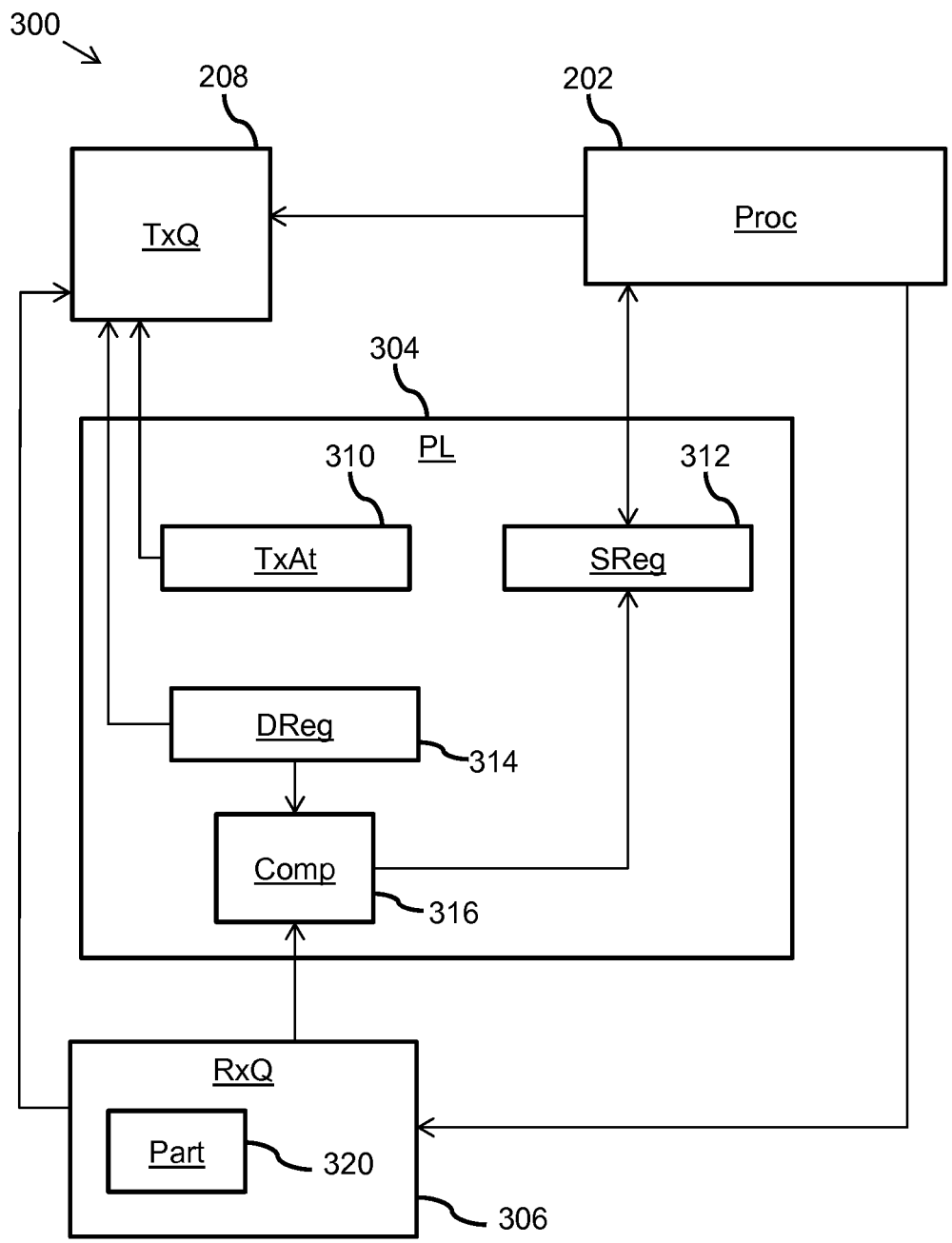

FIG. 3 presents another view of the cut-through forwarding module 300.

FIG. 3 presents another embodiment of the receiver unit RxQ, 306. The receiver unit RxQ, 306 is similar to the receiver unit RxQ, 206 of FIG. 2. The receiver unit RxQ, 306 comprises a partitioning unit Part, 320 which is configured to partition the received data packets into data blocks. In an embodiment, the partitioning unit Part, 320 may be configured to partition the received data packets into data blocks of an equal size, for example, 8 bytes per data block, or, in another embodiment, 4 bytes per data block.

The receiver unit RxQ, 306 is configured to provide the first data block of received data packets to a pre-loading unit 304. Further, under control of a processing unit Proc, 202, the receiver unit RxQ, 306 transfers all or specific data blocks of received data packets to a transmitter unit TxQ, 208. In another embodiment, the data blocks are transferred by the receiver unit RxQ to the processing unit Proc, 202 only and the processing unit Proc, 202 takes care of the transmission of the data blocks to the pre-loading unit 304 and the transmitter unit 208. In yet another embodiment, the receiver unit RxQ transfers the data blocks to the pre-loading unit 304 for being compared with the content of the pre-loading unit 304 (more details are discussed in the following discussion) and the data blocks are transferred to the processing unit Proc, 202, which transfers the data blocks to the transmitter unit TxQ when necessary.

FIG. 3 further presents an embodiment of the preloading unit PL, 304. The pre-loading unit PL, 304 comprises a data block storage register Dreg, 314 for storing the first data block. The data block storage register Dreg, 314 has the size of a single data block. However, if the cut-through forwarding module is capable of handling data blocks of different sizes, the size of the data block storage register is at least large enough to store the largest possible data block size. The data block storage register Dreg, 314 may be coupled directly to the transmitter unit TxQ, 208 such that the content stored in the data block storage register Dref, 314 can be pre-loaded into the transmitter unit TxQ, 208.

The preloading unit PL, 304 further comprises a comparing unit Comp, 316 which compares a content of a first data block of a received data frame with the content of the data block stored in the pre-loading unit PL, 304. Thus, when the receiver receives a new data packet, the first data block of that data packet is forwarded to the comparing unit Comp, 316. Based on the result of the comparison, the Processing unit Proc, 202 is able to decide whether the data block stored in the pre-loading unit PL, 304 must be used as the first data block of a data frame to be transmitted (being the data frame which is based on the data frame that is being received at that specific moment in time). The comparing unit Comp, 316 provides a signal comprising the result of the comparison to the processing unit Proc, 202. Such a signal may be an interrupt, or in a specific embodiment a status information signal or a status information bit which is stored in a status register. In an embodiment, the interrupt may be a maskable interrupt which is provided to a central processing unit of the device which comprises the cut-through forwarding module 200 to inform applications that the received first data block did, for example, unexpectedly not match the content of the data block storage register Dref.

In an embodiment, the comparing unit Comp, 316 may be realized by means of an XOR function which compares bits of the data block stored in the pre-loading unit PL, 304 with the bits of the first data block of a later received data frame. If the result of the XOR function is that no bits are different, the comparing unit Comp, 316 may inform the processing unit Proc, 202 that the first data block of the data frame that is being received at that specific moment in time is equal to the data block stored in the pre-loading unit PL, 304, which may trigger the processor unit Proc, 202 to control the use of the pre-loaded first data block which is already present in the transmission queue of the transmitter unit TxQ, 208. If the processing unit Proc, 202 is informed that the comparison revealed that the first data block of the data frame that is being received at that specific moment in time is different from the data block stored in the pre-loading unit PL, 304, the processing unit Proc, 202 may decide not to use the pre-loaded first data block which is already present in the transmission queue of the transmitter unit TxQ, 208 and simultaneously control the transfer of the most recently received first block to the transmitter unit TxQ, 208 and/or the transfer of this first data block to the pre-loading unit PL, 304. It is noted that the comparison by an XOR function may be implemented in hardware and that the comparison may be performed relatively fast. Thus, the comparing of the content of the first data block of a received data frame with the content of the data block stored in the pre-loading unit PL, 304 does not introduce additional latency.

The pre-loading unit PL, 304 may optionally comprise a transmission attributes register TxAt, 310 which comprises attributes that are being used by the transmitter unit TxQ, 208 for transmitting the data of the data block that is stored in the pre-loading unit PL, 304. If such a transmission attributes register TxAt, 310 is present in the pre-loading unit PL, 304, the pre-loading unit PL, 304 is further configured to provide the transmission attributes to the transmitter unit TxQ, 208 while pre-loading the stored data bock into the transmitter unit TxQ, 208. Thus, according to this embodiment, the transmitter unit TxQ, 208 is configured to receive transmission attributes together with data blocks and the transmission attributes may be stored together with the received data block in a transmission queue.

The pre-loading unit PL, 304 may optionally comprise a status and control attributes register SReg, 312 in which status and control attributes are stored. The status attributes mainly relate to the status of the pre-loading unit PL, 304. The control attributes mainly relate to the control of the pre-loading unit PL, 304 by the processing unit Proc, 202. The status and control attributes register Sreg, 312 is configured to be read by the processing unit Proc, 202 and in this optional embodiment the processing unit Proc, 202 is configured to write control information in the status and control attributes register Sref, 312. Optionally, the pre-loading unit PL, 304 is capable of reading and writing into the status and control attributes register SReg, 312. Examples of status attributes are: "reset" which may be used by the processing unit Proc, 202 to flush and unlock the registers of the pre-loading unit PL, 204; "locked" which indicates whether the data block storage register Dreg, 314 is filled with a data block and may not be overwritten; "mismatch expected" is an attribute which indicates that it is expected that first data blocks of received data frames are not exactly equal to the data block stored in the data storage register Dreg, 314—this attribute allows the use of the pre-loaded data block despite that there is a mismatch between the first data block of the received data frames and the data block stored in the pre-loading unit PL, 304; "mismatch" is an attribute which indicates whether the last performed comparison revealed that the received first block did not match the content of the data store register Dreg, 314; "change" which may be set by the processing unit Proc, 202 to indicated that the content of the data storage register Dreg, 314 must be overwritten with the first data block of the data frame that is currently being received; "size" which indicates the number of bits or bytes of the data blocks—this may be the size of the data block stored in the pre-loading unit PL, 204 or the size which is used for all data blocks processed by the cut-through forwarding module 200. The content of attributes may be stored as bits, bytes, or, for example, instances of objects, etc. The information of the attributes may, for example, be represented by a 0 or 1, a logical true or false, or any other expression representing information.

In FIG. 3 lines are drawn between the processing unit Proc, 202 and the receiver unit RxQ, 306 and the Transmitter unit TxQ, 208. This does not necessarily mean that in all implementations there is a direct physical connection between the processing unit Proc, 202 and the receiver unit RxQ, 306 and the Transmitter unit TxQ, 208. The processing unit Proc, 202 may use the status and control attributes register Sreg, 312 of the pre-loading unit 304, PL to control different streams of data in the cut-through forwarding module. For example, the processing unit Proc, 202 may set in the status and control attributes register Sreg, 312 one or more bits which is used by the pre-loading unit PL, 304, the receiver unit RxQ, 306 and the transmitter unit TxQ, 208 to decide whether a specific data block must be transferred from the receiver unit RxQ, 306 to the pre-load unit PL, 304 and/or to the transmitter unit TxQ, 208 and whether the data block stored in the pre-loading unit PL, 304 must be pre-loaded into the transmitter unit TxQ, 208 and whether the pre-loaded data block must be used by the transmitter unit TxQ, 208 in the subsequently sent data frame.

Figure 4:
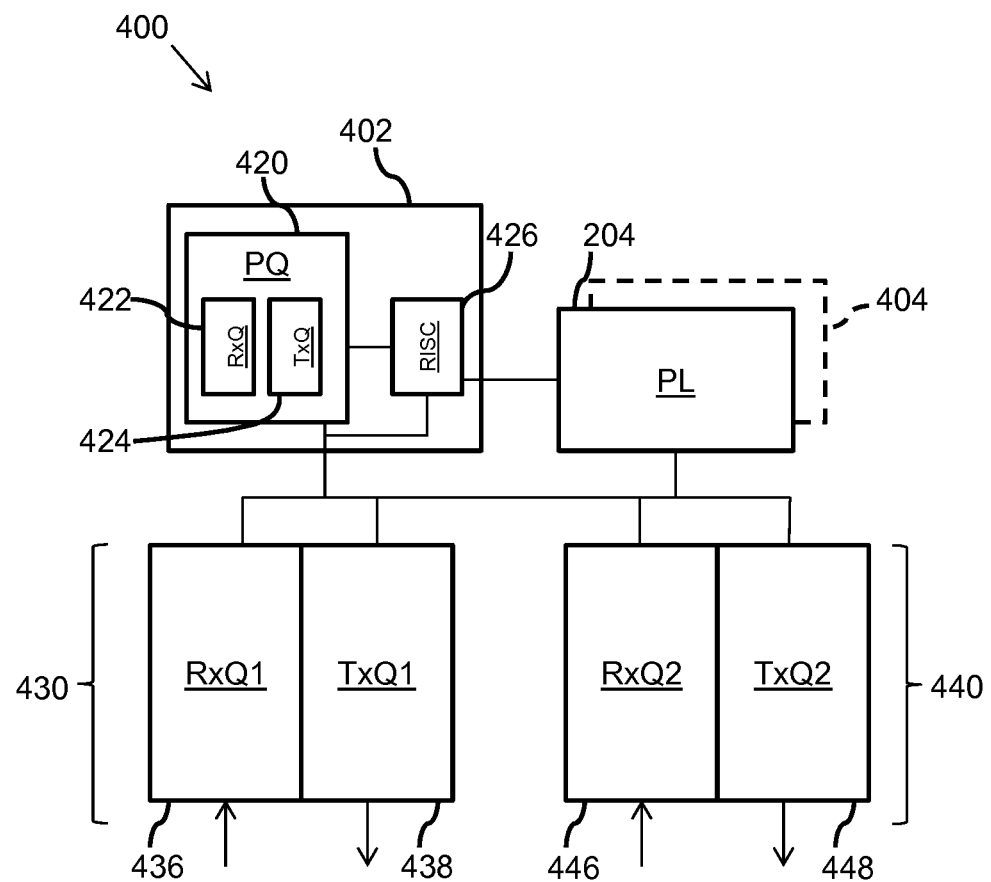

FIG. 4 presents another embodiment of a cut-through forwarding module 400. The cut-through forwarding module 400 comprises a first receiver/transmitter pair 430, a second receiver/transmitter pair 440, a processing unit 402 and a pre-loading unit PL, 204. The pre-loading unit PL, 204 is similar to the pre-loading units discussed before. The first receiver/transmitter pair 430 and the second receiver/transmitter pair 440 are arranged for being connect to different physical connection, which means that one of the pairs 430, 440 is connected to a first other node and the other one of the pairs 430, 440 is connected to second other node. As such, the cut-through forwarding module 400 of FIG. 4 may be used in a slave node 120 of FIG. 1. Each receiver/transmitter pair 430 comprises a receiver unit RxQn, 436, 446 and a transmitter unit TxQn, 438, 448 which may send and receive at the same moment via a single physical connection with another node coupled to the single physical connection. In an embodiment, the cut-through forwarding module 400 may be arranged such that all data received at the receiver unit RxQ2, 446 of the second receiver/transmitter pair 440 is automatically forwarded to the transmitter unit TxQ1, 438 of the first receiver/transmitter pair 430 without being processed and/or inspected by the processing unit 402 and/or the pre-loading unit PL, 204. The data which is received by the receiver unit RxQ1, 436 of the first receiver/transmitter pair 430 is processed, analysed and monitored by the processing unit 402 and the pre-loading unit PL, 204 as discussed in previous embodiments. Thus, the pre-loading unit PL, 204 is used to store a first data block of a data packet received at the receiver unit RxQ1, 436 of the first receiver/transmitter pair 430 and to pre-load the stored data block into the transmission queue of the transmitter unit TxQ2, 448 of the second receiver/transmitter pair 440 when no data is being received at the receiver unit RxQ1, 436 of the first receiver/transmitter pair 440—further, the processing unit 402 is configured to control the use of the data block which is pre-loaded into the queue of the transmitter unit TxQ2, 448.

In another embodiment, the cut-through forwarding module 400 comprises two pre-loading units 204. A first pre-loading unit PL, 204 is used in the data stream from the receiver unit RxQ1, 436 of the first receiver/transmitter pair 430 towards the transmitter unit TxQ2, 448 of the second receiver/transmitter pair 440. A second pre-loading unit PL, 404 is used in the data stream from the receiver unit RxQ2, 446 of the second receiver/transmitter pair 430 towards the transmitter unit TxQ1, 438 of the first receiver/transmitter pair 440.

The processing unit 402 of the cut-through forwarding module 400 comprises a RISC processor 426 and a processing queue PQ, 420. The processing queue is subdivided in a receiving processing queue RxQ, 422 and a transmission processing queue TxQ, 424. The receiving processing queue RxQ, 422 receives data blocks from one of or both of the receiver units RxQn, 436, 446. If data is being processed, the processed data blocks are put into the transmission processing queue TxQ, 424 for being transferred to one of the transmitter units TxQn 438, 448 which has to transmit a data frame with the processed data blocks. The processing queue PQ, 420 may be implemented as a hardware queue, but may also be a software solution which operates in close cooperation with a storage medium (such as, for example, a volatile memory unit). The processing queues RxQ, TxQ may be implemented as First In First Out (FIFO) queues, but may also be implemented as other types of queues in which, for example, data blocks are queued in correspondence with a priority value that is assigned to the data blocks. It is to be noted that each entry in the processing queues RxQ, TxQ, 422, 424 is a data block. In the cut-through forwarding module 400 all data is transferred and processed in data blocks to obtain the deterministic latency.

The RISC processor 426 of the processing unit 402 is a processor capable of executing computer program code. The programming code may relate to applications which run on the device which incorporates the cut-through forwarding module. The programming code may also relate to functions which are executed by the processing unit 402, such as i) the control of transfers of data blocks to the relevant transmitter units TxQn, 438, 448, ii) the control of transfers of first data blocks of specific received data frames to pre-loading unit 204, iii) the control of the use of the pre-loaded data block as a first data block of a data frame which is going to be transmitted by one of the transmitter units TxQn, 438, 448, iv) the control and setting of the pre-loading unit PL, 204, 404 via, for example, the status and control register (as discussed in the context of FIG. 3), and, for example, v) the control and signalling of status of the cut-through forwarding module to another processor running higher layer functions. The RISC processor 426 may execute several threads, such as, for example, threads which are related to a single receiver unit RxQn, 436, 446 for handling the reception of data blocks as received by and partitioned by the respective receiver units RxQn, 436, 446, and such as, for example, threads which are related to a single transmitter unit TxQn 438, 448 for controlling the transmission of data blocks via the respective transmitter units TxQn 438, 448. The RISC processor 426 may further be provided with a storage medium such as, for example, a volatile external memory or an internal cache memory. Further, a RISC processor 426 is configured to run a simplified instruction set but it is to be noted that the invention is not limited to the use of RISC processors only—other processors with more complex instructions may also be used instead of the RISC processor 426. Further, the RISC processor 426 may have a single core which executes all thread in a certain order and the RISC processor 426 may have a plurality of cores such that, for example, certain time critical threads are only executed on a single core.

The use of a processing unit 402 which comprises a processor which runs programs has the advantage that several cut-through forwarding schemes may be supported by the cut-through forwarding module 400. However, the processing may introduce some latency and some jitter. Therefore, in combination with the pre-loading unit PL, 204 an optimal reduction of latency and jitter may be obtained in a cut-through forwarding scheme because the first data block to be transmitted is already pre-loaded into transmission queue of a specific transmitter unit TxQn, 438, 448 and no additional latency of jitter need to be introduced because of the processing of the respective data block by the processing unit 402 and the transfer of this data block from the receiver unit RxQn 436, 446 to the receiving processing queue RxQ, 422 and from the transmission processing queue TxQ, 424 to the transmitter unit TxQn, 438, 448.

The cut-through forwarding modules 200, 400 of FIG. 2 or 4 may be integrated in one large integrated circuit and may be manufactured on a semiconductor device.

In the previous FIGS. 2 and 3 the pre-loading unit 204, 304 is drawn as a separate entity. It is to be noted that the invention is not limited to pre-loading units which are only available in a separate hardware block, or are a separately identifiable unit on a semiconductor device. Further, the pre-loading unit is not necessarily implemented in hardware. In a specific embodiment the processing unit Proc, 202 runs program code which provides together with a volatile memory the functionality of the pre-loading unit PL, 204, 304.

It is further to be noted that the invention is not limited to a specific internal communication structure between the processing unit Proc, 202, the pre-loading unit PL, 204, 304, the receiver unit RxQ, 206, 306 and the transmitter unit TxQ, 208. For example, the different units may communicate with each other via direct communication connections, via a single bus-communication structure, combinations of these communication structures and/or via other means for transferring data, attributes and signals in a cut-through forwarding module. As used herein, the term "bus" is used to refer to a plurality of signals or conductors which may be used to transfer one piece of information at one moment of time.

Figure 5:
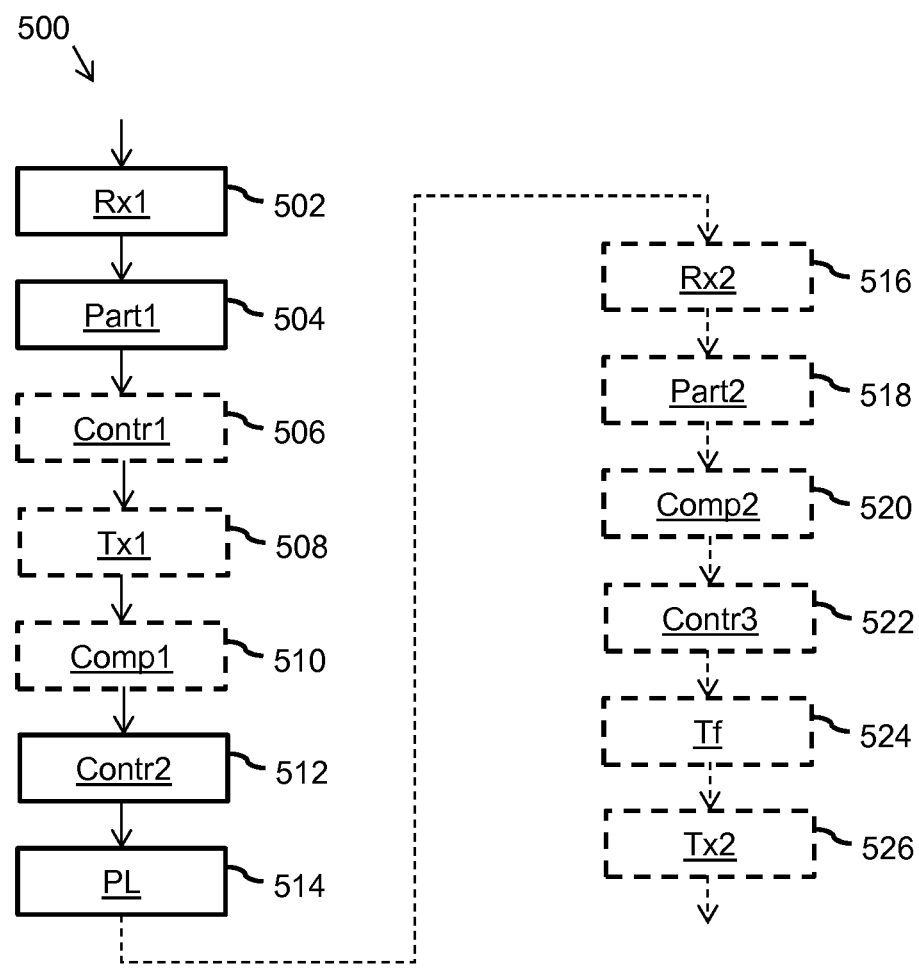

FIG. 5 presents a method 500 of receiving and transmitting data frames in a cut-through forwarding mode. The method comprises the stages of: i) receiving Rx1, 502 a first data frame by a receiving unit; ii) partitioning Part1, 504 the first data frame into data blocks; iii) optionally controlling Contr1, 506, under control of a processing unit, the transfer of the data blocks to a transmitter unit; iv) optionally transmitting Tx1, 508 a second data frame by the transmitter unit, the second data frame comprises the transferred data blocks; v) optionally comparing Comp1, 510 a first data block of the first data frame with the data block stored in the pre-loading unit; vi) controlling Contr2, 512, under control of a processing unit, the transfer of the first data block of the first data frame to the pre-loading unit and controlling Contr2, 512 the storage of the transferred first data block in the pre-loading unit; vii) pre-loading PL, 514 the data block stored in the pre-loading unit into the transmitter unit if no data is being received by the receiver unit. No reception of data by the receiver unit means that no information at all is received by the receiver unit or that a preamble of a subsequent data frame is being received by the receiver unit.

The method further comprises the optional stages: i) receiving Rx2, 516 a third data frame by the receiver unit; ii) partitioning Part2, 518 the third data frame into data blocks; iii) comparing Comp2, 520 the first data block of the third data frame with the data block stored in the pre-loading unit; iv) controlling Contr3, 522, under control of a processing unit, the use of the data block which is pre-loaded into the transmitter as a first data block of a fourth data frame to be transmitted on basis of the received third data frame; v) transferring Tf, 524 a second and further data block of the third data frame to the transmitter unit; vi) transmitting Tx2, 526 the fourth data frame by the transmitter unit wherein the fourth data frame comprises the pre-loaded first data block and the second and further transferred data blocks.

It is to be noted that stages of the method 500 are drawn in FIG. 5 in a specific order. In so far the stages do not directly depend on each other, the order in which the stages are performed may differ from the drawn order. For example, the controlling Contr1, 506 of the transfer of the data block to a transmitter unit and the transmitting Tx1, 508 of a second data frame by the transmitter unit may also be performed after the controlling Contr2, 512 of the transfer of and storages of the first data block into the pre-loading unit.

In a Summary:

The invention relates to cut-through forwarding module 200, an integrated circuit, a semiconductor device and a method of receiving and transmitting data frames in a cut-through forwarding mode. The cut-through forwarding module 200 processes received data frames 210, 216 in data blocks. The module 200 comprises a pre-loading unit 204 for storing a first data block BL1 of a received data frame 210. The stored first data block BL1 may be pre-loaded by the pre-loading unit 204 in a transmitter unit 208 before a receiver unit 206 receives a subsequent data frame. The processing unit 202 controls the transfer of a first data block to the pre-loading unit 204 and controls the use of a pre-loaded data block as a first data block of a data frame to be transmitted.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

In one embodiment, cut-through forwarding module 200, 300, 400 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The semiconductor substrate used to manufacture the semiconductor device which comprises the cut-through forwarding module described herein can be any semiconductor material or combinations of materials, such as gallium arsenide, silicon germanium, silicon-on-insulator (SOI), silicon, monocrystalline silicon, the like, and combinations of the above.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 2, 3, and 4 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of modules 200, 300, 400 are circuitry located on a single integrated circuit or within a same device. Alternatively, modules 200, 300, 400 may include any number of separate integrated circuits or separate devices interconnected with each other. Also for example, modules 200, 300, 400 or portions thereof may be soft or code representations of physical circuitry or of logical representations convertible into physical circuitry. As such, modules 200, 300, 400 may be embodied in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A cut-through forwarding module comprising:
    a receiver unit being configured to receive data frames and to partition data packets of the data frames into data blocks,
    a transmitter unit being configured to transmit data frames based on received data packets,
    a pre-loading unit being configured to store a first data block of a first received data frame and to pre-load the stored first data block into the transmitter unit before a subsequent data frame is being received by the receiver unit, a processing unit being configured to control a transfer of the first data block of the first received data frame to the pre-loading unit and to control use of the pre-loaded first data block as a first data block of subsequent data frame to be transmitted by the transmitter unit, the subsequent data frame is to be transmitted after a transmission of a first transmitted data frame being based on the first received data frame.

2. A cut-through forwarding module according to claim 1, wherein the processing unit is configured to control the transfer of the first data block of the first received data frame to the pre-loading unit when a content of the first data block of the first received data frame does not match a content of the first data block stored in the pre-loading unit.

3. A cut-through forwarding module according to claim 1, wherein the processing unit is configured to control the use of the pre-loaded data block as a first data block of the subsequent data frame to be transmitted if the subsequent data frame to be transmitted is based on a subsequent received data frame of which a content of the first data block matches the content of the first data block stored in the pre-loading unit.

4. A cut-through forwarding module according to claim 1, wherein the processing unit is further configured to process the data blocks and to control transfer of data blocks to the transmitter unit for transmission.

5. A cut-through forwarding module according to claim 1, wherein the pre-loading unit is configured to transfer the stored first data block to the transmitter unit when the receiver unit receives a preamble of a subsequent data frame.

6. A cut-through forwarding module according to claim 1, wherein the pre-loading unit comprises a data block storage register for storing the first data block.

7. A cut-through forwarding module according to claim 1, wherein the pre-loading unit comprises a comparing unit for comparing a content of a first data block of a received data frame with the content of the first data block stored in the pre-loading unit.

8. A cut-through forwarding module according to claim 7, wherein the comparing unit is configured to provide an interrupt to the processing unit when the content of the first block of the received data frame differs from the content of the first data block stored in the pre-loading unit.

9. A cut-through forwarding module according to claim 6, wherein the comparing unit is configured to apply an XOR function to the content of a first block of the received data frame and the content of the first data block stored in the pre-loading unit.

10. A cut-through forwarding module according to claim 1, wherein the pre-loading unit comprises a transmission attributes register comprising transmission attributes used by the transmitter unit for transmitting the data of the first data block being stored in the pre-loading unit, the pre-loading unit being configured to provide the transmission attributes to the transmitter unit while pre-loading the stored first data block into the transmitter unit.

11. A cut-through forwarding module according to claim 1, wherein the pre-loading unit comprises a status and control attributes register which comprises status and control attributes related to a status of the pre-loading unit, the status and control attributes register is configured to be read by the processing unit and the processing unit being configured to write status information in the status and control attributes register.

12. A cut-through forwarding module according to claim 11, wherein the status and control attributes of the pre-loading unit comprise at least one of the following attributes:

reset attribute for indicating a required reset of the pre-loading unit, locked attributed for indicating whether a data block is stored in the pre-loading unit and whether the data block may be overwritten, mismatch expected attribute for indicating whether it is expected that first data blocks of received data packets may be different from the first data block stored in the pre-loading unit, mismatch attribute for indicating whether the first data block of the last received data frame did not match with the first data block stored in the pre-loading unit, change attribute for indicating whether the data block stored in the pre-loading unit must be overwritten by the first data block of the next received data frame or by the first data block of the data frame currently being received, size attribute for indicating a size of the data blocks.

13. A cut-through forwarding module according to claim 1, wherein the data blocks are of equal length.

14. An integrated circuit comprising at least one cut-through forwarding module according to claim 1.

15. A semiconductor device comprising at least a cut-through forwarding module according to claim 1.

16. A method of receiving and transmitting data frames in a cut-through forwarding mode, the method comprises:
receiving a first data frame by a receiver unit,
partitioning the first data frame into data blocks,
controlling, under control of a processing unit, the transfer of the first data block of the first data frame to a pre-loading unit and controlling the storage of the transferred first data block in the pre-loading unit, and
pre-loading the data block stored in the pre-loading unit into the transmitter unit if no data is being received by the receiver unit.

17. A method of receiving and transmitting data frames in a cut-through forwarding mode according to claim 16, the method further comprises:
controlling, under control of a processing unit, the transfer of the data blocks to a transmitter unit, and
transmitting a second data frame by the transmitter unit, the second data frame comprises the transferred data blocks.

18. A method of receiving and transmitting data frames in a cut-through forwarding mode according to claim 16 the method further comprises:
receiving a third data frame by the receiver unit,
partitioning the third data frame into data blocks,
controlling the use of the data block which is pre-loaded into the transmitter unit as a first data block of a fourth data frame to be transmitted, the fourth data frame is to be based of the received third data frame,
transferring a second and further data block of the third data frame to the transmitter unit,
transmitting the fourth data frame by the transmitter unit, the fourth data frame comprises the pre-loaded first data block and the second and further transferred data blocks.

19. A method of receiving and transmitting data frames in a cut-through forwarding mode according to claim 16, the method further comprises:
comparing a first data block of the first data frame with the data block stored in the pre-loading unit,
and wherein the stage of controlling the transfer of the first data block of the first data frame to the pre-loading unit results in the transfer and storage of the first data block into the pre-loading unit when the compared first data block is different from the data block stored in the pre-loading unit.

20. A method of receiving and transmitting data frames in a cut-through forwarding mode according to claim 18 further comprising:

comparing a first data block of the third data frame with the data block stored in the pre-loading unit, and wherein the stage of controlling the use of the data block which is pre-loaded into the transmitter results in the use of the pre-loaded data block for the fourth data frame when the compared first data block is equal to the data block stored in the pre-loading unit.

* * * * *